J. M. BERRY, Jr.

STUB HOLDER.

No. 10,905. Reissued Mar. 6, 1888.

WITNESSES
F. L. Ouraud
Maggie Turner

Jasper M. Berry Jr
INVENTOR
by Price & Stewart
Attorneys.

N. PETERS, Photo-Lithographer, Washington, D. C.

UNITED STATES PATENT OFFICE.

JASPER M. BERRY, JR., OF BALTIMORE, MARYLAND.

STUB-HOLDER.

SPECIFICATION forming part of Reissued Letters Patent No. 10,905, dated March 6, 1888.

Original No. 376,062, dated January 10, 1888. Application for reissue filed January 25, 1888. Serial No. 261,537.

*To all whom it may concern:*

Be it known that I, JASPER M. BERRY, Jr., a citizen of the United States, residing in the city of Baltimore, State of Maryland, have invented certain new and useful Improvements in Stub-Holders, of which the following is a full and complete specification, in which reference is made to the accompanying drawings.

The object of my invention is to provide check and other books having sections that may be torn out, leaving stubs, with an improved device for holding the stubs thus left so that they will lie flat, or as nearly so as practicable, while the next section or page is being inscribed.

The construction and combination of parts are as hereinafter set forth and claimed.

Figure 1:
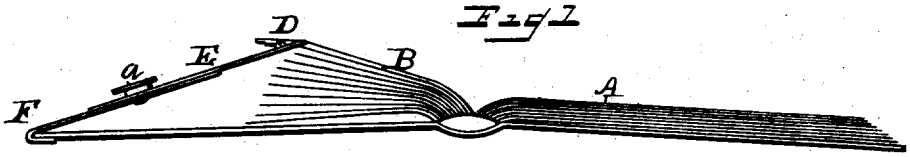
Figure 2:
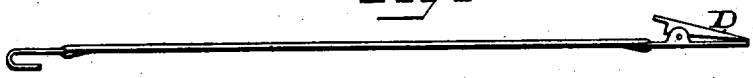
Figure 3:
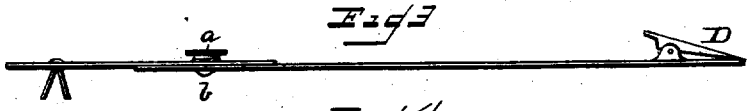
Figure 4:
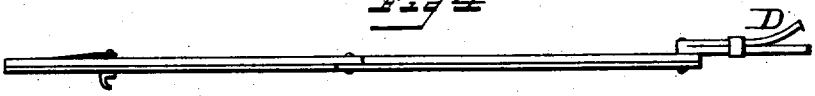
Figure 5:
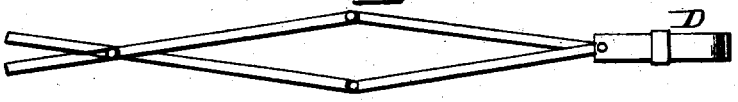
Figure 6:
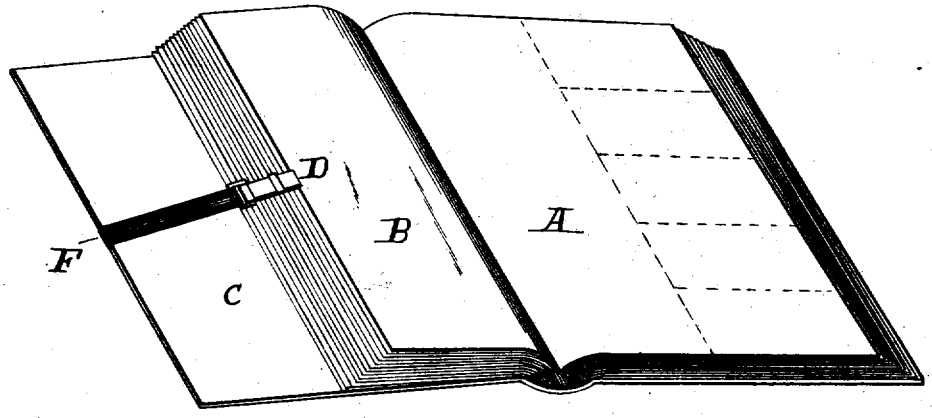

In the drawings, Figure 1 represents an end view of a book laid open, having full leaves on one side and a stub on the other, said stub being held in a horizontal position by the clamp and connections securing it to the cover of the book. Fig. 2 is a side view of the clamp and band shown in Fig. 6, in which the band is elastic and provided at one end with a clamp and at the other end with a hook. Fig. 3 is a side view of a clamp and band, in which the band is made of rigid material—such as a strip of metal—and in two pieces, each of which is slotted in the direction of its length and secured together by a thumb-screw, thus causing it to be adjustable lengthwise. This band is provided at one end with a clamp and at the other end with a staple or pin for securing said band permanently to the cover of the book. In Fig. 1 a clamp is shown of the same character as Fig. 3, but provided with a hook instead of a staple. Fig. 4 is a side view of the clamp and band of which Fig. 5 is a plan. Fig. 5 is a plan of an extensible band made of four rods in the form of a parallelogram riveted loosely together. To one end of this parallelogram is attached a clamp, and at the other the rods extend beyond the rivet, and a spring is arranged between them, by means of which they are driven apart to the scope of the spring, thus decreasing the length of the band. Fig. 6 is a perspective view of a book having a stub which is held in a horizontal position by my clamp.

In the drawings, A represents the body of a book; B, the stub; C, the cover beyond the stub; D, a clamp secured to said stub, or provided to be so secured; E, the band connecting said clamp to the hook or staple F; F, a hook or staple for securing the band, either permanently or temporarily, to the cover C of the book.

Figs. 3 and 1 show a form of clamp D and band E, in which the clamp is of any desired form and the band made of two strips of metal slotted in the direction of their length and secured together by a set-screw, *a*, and nut *b*. In Fig. 1 this band is shown provided with a hook, while in Fig. 3 it is shown with a staple or fastening-pin to secure it permanently to the cover of the book.

Fig. 2, as above described, shows a clamp and an elastic band—such as rubber or other flexible material—and provided with either a hook or staple to attach it to the cover of the book.

Figs. 4 and 5 show another form of band, which consists of a parallelogram of strips of metal riveted together. To one angle is attached the clamp. At the angle opposite to the clamp the strips are extended beyond the rivet to a distance of about one inch. To the rivet is secured a spring provided with two arms, each of which bears upon one of the extending ends of the strips, exerting a pressure upon them to separate them, and thus expand the parallelogram and shorten the distance between the spring and the clamp, thus exerting a pressure upon the stub when attached to it.

The operation of my device is as follows: Whenever books are used from which sections are to be torn, leaving a stub, great inconvenience has been encountered in causing the stub to lie down while the adjoining page was being filled up or entries made upon the back of the stub. To accomplish this result I have devised the means herein shown, which consists of any form of clamp suitable for the purpose, which is caused to take hold of the edge of the last stub, being provided with jaws or teeth, or any suitable means to prevent its slipping. To this clamp is attached any of the various forms of band previously shown and described, which is either rigid or flexible, and to the end of which is fastened a hook for temporary attachment, or staple for permanent attachment. It will be seen that with this clamp in position the stub will be held down flat and the book will be always ready for use. The clamp may of course be left upon the book when it is closed, and when reopened will fold back the stub in proper position for convenient use.

In the drawings I have shown several forms of clamp and band, hook and staple, because I do not intend to confine myself to the form of any of them. They may be altered at will without changing the operation or effect of my invention.

Having thus described my invention, what I claim, and desire to secure by Letters Patent, is—

1. The combination, with a book having a stub, of a clamp grasping the edge of said stub and provided with an extensible band or connection, the end of which is adapted to be secured or attached to the cover of the book adjacent to said stub.

2. The combination, with a book having a stub, of a clamp grasping the edge of said stub and provided with an elastic band, the end of which is adapted to be secured or attached to the cover of the book adjacent to said stub.

JASPER M. BERRY, JR.

Witnesses:
A. D. JOHNSON,
WM. H. H. RALEIGH.